United States Patent [19]

Hane et al.

[11] Patent Number: 4,559,973
[45] Date of Patent: Dec. 24, 1985

[54] WATER IMPERVIOUS HEAT SHRINKABLE TUBE

[75] Inventors: Yoshinari Hane, Isehara; Hiroshi Suzuki, Kanagawa; Tadayuki Uematsu, Chiba; Shigeru Matsumoto; Tetuo Momma, both of Yokohama; Akihiko Kamiya, Kawasaki; Mitugu Saito, Zushi, all of Japan

[73] Assignee: The Furukawa Electric Co., Ltd., Tokyo, Japan

[21] Appl. No.: 681,088

[22] Filed: Dec. 13, 1984

Related U.S. Application Data

[63] Continuation of Ser. No. 493,785, May 12, 1983, abandoned.

[30] Foreign Application Priority Data

Nov. 26, 1982 [JP] Japan .............................. 57-177753[U]

[51] Int. Cl.$^4$ .............................................. H01R 4/70
[52] U.S. Cl. ................................ 138/138; 174/DIG. 8
[58] Field of Search ................. 174/DIG. 8; 138/138; 264/230; 428/36, 913

[56] References Cited

U.S. PATENT DOCUMENTS

| | | | |
|---|---|---|---|
| 2,176,109 | 10/1937 | Ratay | 138/138 |
| 3,329,764 | 7/1967 | Tanges | 174/DIG. 8 |
| 3,467,761 | 9/1969 | Plummer | 174/DIG. 8 |
| 3,542,077 | 11/1970 | Muchmore | 174/DIG. 8 |
| 3,898,369 | 8/1975 | Clabburn | 174/DIG. 8 |
| 4,016,356 | 4/1977 | McLoughlin | 174/DIG. 8 |
| 4,151,364 | 4/1979 | Ellis | 174/DIG. 8 |
| 4,341,921 | 7/1982 | Simpson | 174/DIG. 8 |

FOREIGN PATENT DOCUMENTS

| | | |
|---|---|---|
| 57-43160 | 3/1982 | Japan . |
| 58-29659 | 2/1983 | Japan . |
| 1259774 | 1/1972 | United Kingdom . |

*Primary Examiner*—John W. Shepperd
*Attorney, Agent, or Firm*—Frishauf, Holtz, Goodman and Woodward

[57] ABSTRACT

A water impervious heat shrinkable rubber or plastic tube wherein a laminated metal foil layer consisting of a metal foil film having a thickness of 0.01 mm to 0.1 mm and, laminated on each surface thereof, an electrically insulating or semiconducting rubber or plastic sheet extends along the entire or partial length of the tube and over the entire periphery of the tube, the two longitudinal edges of the laminated metal foil layer overlapping in a predetermined width and the laminated metal foil layer being so arranged in the tube that the thickness of the inner tube layer inside the laminated metal foil layer is smaller than the thickness of the outer tube layer outside the laminated metal foil layer.

25 Claims, 18 Drawing Figures

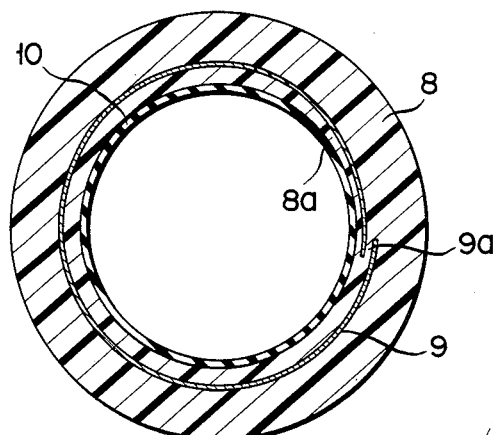
FIG. 7
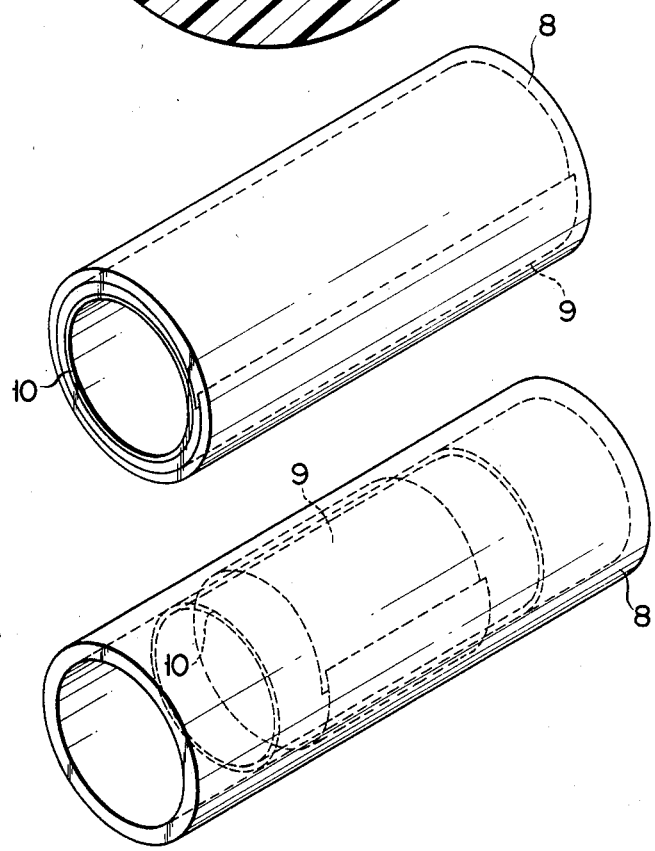
FIG. 8
FIG. 9A
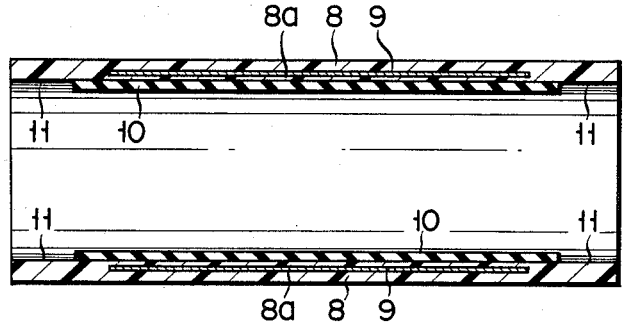
FIG. 9B

WATER IMPERVIOUS HEAT SHRINKABLE TUBE

This application is a continuation of application Ser. No. 493,785, filed May 12, 1983, now abandoned.

BACKGROUND OF THE INVENTION

The present invention relates to a water impervious heat shrinkable tube which is impermeable to water.

A heat shrinkable rubber or plastic tube is obtained by, for example, a method wherein a rubber or plastic such as polyethylene, polyvinyl chloride, polyester, or ethylene propylene rubber is melted and extruded in a tubular form, the obtained tube is irradiated with an electron beam to be crosslinked; and the crosslinked tube is stretched at a temperature which is lower than the melting point of the rubber or plastic used and higher than the softening point thereof. According to another method, a sheet of a rubber or plastic as mentioned above is irradiated with an electron beam to be crosslinked, stretched by a desired multiple of its initial length, wound to a desired thickness around a mandrel having a desired diameter, and then made into an integral tubular form by heating at a temperature higher than the melting point of the rubber or plastic used.

A heat shrinkable rubber or plastic tube prepared in this manner (to be referred to as a heat shrinkable tube hereinafter) is capable of returning, when heated, to its original shape seen prior to stretching. Utilizing this property, a tight rubber or plastic covering may be formed on a desired object. For this reason, heat shrinkable tubes have been recently used in various fields.

However, when a heat shrinkable tube is used in water for a long period of time, water permeate through the rubber or plastic covering. Therefore, such a heat shrinkable tube may not be used where a high water impermeability is required.

Meanwhile, power cables are required to be water impermeable in order to prevent insulation degradation due to formation of a water-tree in an insulator which is caused by water permeation into the cables. In order to form a protective layer at a joint of power cables, a method is generally adopted wherein a heat shrinkable rubber or plastic tube is fitted around a cable joint and is heated to be shrunk. However, for the same reason as described above, the joint thus prepared does not have satisfactory water impermeability.

As a means for improving the water impermeability of a heat shrinkable tube, the present inventors have previously proposed a heat shrinkable tube wherein a metal foil film which is almost completely impervious to water is so laminated on the inner surface of the tube that the metal foil film extends along the entire circumference of the tube.

The heat shrinkable tube previously proposed by the present inventors has the configuration shown in FIGS. 1 and 2. Referring to FIGS. 1 and 2, two or more metal foil films 2 extend along the entire circumference of the tube with their longitudinal edges 2a overlapped each other in a predetermined width to follow the shrinkage of a heat shrinkable material layer 1. However, a water impervious heat shrinkable tube of this type has a large number of lapped portions, resulting in a complex configuration and a complex manufacturing process. In addition to this, depending upon the positions of the metal foil films 2 formed in the heat shrinkable tube 1, the metal foil films 2 form rough wrinkles which make gaps in the longitudinal direction of the tube 1 when the tube 1 is shrunk. Thus, the metal foil films 2 may not be tightly fitted on the cable joint.

In an extreme case, as shown in FIG. 3, the metal foil films 2 form rough wrinkles 3 in the longitudinal direction of the tube 1 upon shrinkage thereof. This results in the formation of small gaps 5 which extend on the outer circumferential surface of a cable 4 in the longitudinal direction thereof. Then, a problem arises in that when water permeation is caused from the ends of the coated portion of the cable or from a damaged portion thereof, water thus introduced permeates along the longitudinal direction of the cable. In addition, when such wrinkles are formed, the outer surface of the cable becomes non-uniform, providing a poor outer appearance.

SUMMARY OF THE INVENTION

In order to solve this problem, the present inventors have made extensive studies. As a result of such studies, it has been found effective to specifically control the thickness and position of a laminated metal foil layer to be formed integrally with a heat shrinkable tube.

The present invention thus provides a water impervious heat shrinkable rubber or plastic tube wherein a laminated metal foil layer consisting of a metal foil film having a thickness of 0.01 mm to 0.1 mm and, laminated on each surface thereof, an electrically insulating or semiconducting rubber or plastic sheet extends along the entire or partial length of said tube and over the entire periphery of said tube, the two longitudinal edges of said laminated metal foil layer overlapping in a predetermined width and said laminated metal foil layer being so arranged in said tube that the thickness of the inner tube layer inside said laminated metal foil layer is smaller than the thickness of the outer tube layer outside said laminated metal foil layer. When the tube shrinks upon being heated, the metal foil film forms only small wrinkles and shrinks so that the covering layer is tightly fitted and provides an excellent outer appearance.

An adhesive layer is formed as the innermost layer of the water impervious heat shrinkable tube of the present invention as needed. In a water impervious heat shrinkable tube with such an adhesive layer formed thereon, even if the metal foil film in the tube forms rough wrinkles instead of small wrinkles and gaps are formed between the covering layer and the cable or the like along the longitudinal direction thereof, the adhesive layer flows to fill such gaps, so that excellent water impervious performance is provided.

According to the present invention, a laminated metal foil layer is used which comprises a metal foil film having a thickness of 0.01 to 0.1 mm and electrically insulating or semiconducting rubber of plastic films formed on both surfaces of the metal foil film. Furthermore, according to the water impervious heat shrinkable tube of the present invention, the thickness of the inner tube layer inside the laminated metal foil layer is smaller than that of the outer tube layer outside the laminated metal foil layer. These features of the tube facilitate formation of small wrinkles in the metal foil film upon shrinkage thereof, and also result in an excellent outer appearance of the tube. If an adhesive layer is formed as the innermost layer of the tube of the present invention, the adhesive layer flows to further improve the water impervious performance of the tube.

BRIEF DESCRIPTION OF THE DRAWINGS

FIG. 7 is a sectional view of a water impervious heat shrinkable tube having an adhesive layer as the innermost layer according to still another embodiment of the present invention;

FIG. 8 is a perspective view of the tube shown in FIG. 7;

FIG. 9A is a perspective view of a water impervious heat shrinkable tube with an adhesive free absorption region according to still another embodiment of the present invention, and FIG. 9B is a sectional view of the tube shown in FIG. 9A;

DETAILED DESCRIPTION OF THE PREFERRED EMBODIMENTS

Figure 4:
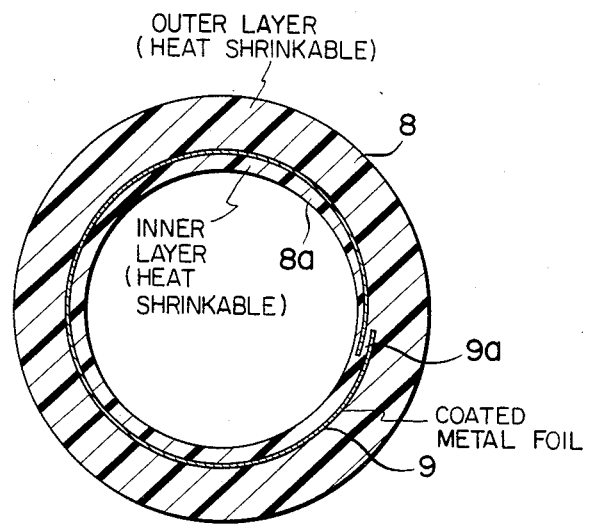
FIG. 4 is a sectional view of a water impervious heat shrinkable tube according to an embodiment of the present invention.
Figure 5:
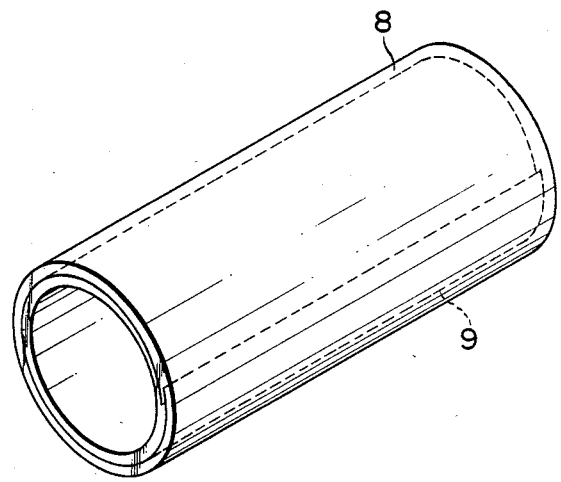
FIG. 5 is a perspective view of the tube shown in FIG. 4.
Figure 6:
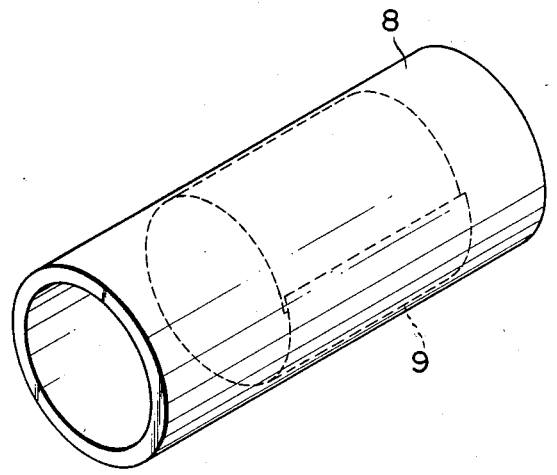
FIG. 6 is a perspective view of a water impervious heat shrinkable tube according to another embodiment of the present invention.

FIGS. 4 to 6 show a water impervious heat shrinkable tube according to an embodiment of the present invention. Referring to FIGS. 4 to 6, reference numeral 8a denotes an inner heat shrinkable material layer and 8 denotes an outer heat shrinkable material layer. A laminated metal foil layer 9 (coated metal foil—FIG. 4) including a metal foil film of copper, aluminum or lead and rubber or plastic films is interposed between the layers 8 and 8a. Two longitudinal edges of the laminated metal foil layer 9 overlap for a predetermined distance in the circumferential direction of the tube to form an overlap portion 9a. Thus, the laminated metal foil layer 9 extends along the entire circumferential direction of the tube.

The laminated metal foil layer 9 is obtained by laminating on both surfaces of a metal foil film electrically insulating or semiconducting rubber or plastic films. When such a combination of a metal foil film and rubber films or a combination of a metal foil film and plastic films is used, the laminated metal foil layer may easily be formed integrally with the heat shrinkable material layers during the manufacture of a tube.

The metal foil film to be used in the present invention has a thickness of 0.01 to 0.1 mm. When the thickness of the metal foil film is less than 0.01 mm, the metal foil film may break or crack upon shrinkage of the tube. On the other hand, when the thickness of the metal foil film exceeds 0.1 mm, the wrinkles formed in the metal foil film upon shrinkage of the tube become too large, so that the advantageous effects of the present invention are impaired.

The excellent water impermeability of the water impervious heat shrinkable tube of the present invention may be facilitated also by applying first an adhesive on a cable joint or the like to be coated, and then a water impervious heat shrinkable tube having no adhesive layer as shown in FIG. 4. Alternatively, as shown in FIG. 7, such excellent water impermeability may be obtained by a water impervious heat shrinkable tube having an adhesive layer 10 as its innermost layer.

In view of the installation procedure, a water impervious heat shrinkable tube with an adhesive layer 10 as its innermost layer as shown in FIG. 7 is preferable for the following reasons. With such a tube, the number of installation steps is smaller; and variations in the water impermeability in the longitudinal direction of a cable or the like to be coated are smaller, irrespective of the installation technique used, than in the case wherein an adhesive layer is formed on a cable or the like to be coated.

When the adhesive layer 10 is formed as the innermost layer of the tube of the present invention, the adhesive layer 10 may be formed along the entire length of a water impervious heat shrinkable tube. However, such an adhesive layer 10 may alternatively be formed only in a portion of a water impervious heat shrinkable tube along its longitudinal direction, where only such a portion is to be treated for watertightness.

The water impermeability of a water impervious heat shrinkable tube along the longitudinal direction thereof is improved over that in the case of a water impervious heat shrinkable tube having an adhesive layer along its entire length if an adhesive free absorption region 11, free of the adhesive layer 10, is formed at least at an end of the tube.

FIGS. 9A, 9B, 10A and 10B show respective configurations of water impervious heat shrinkable tubes with such adhesive free absorption regions.

The effect obtainable with an adhesive free absorption region will now be described.

Figure 10A:
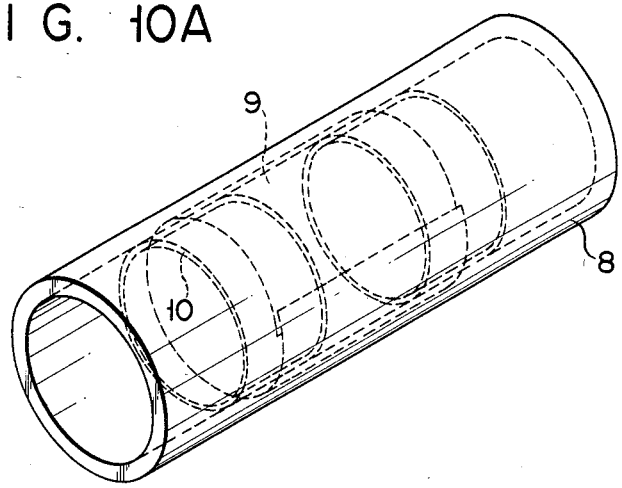
FIG. 10A is a perspective view of a water impervious heat shrinkable tube with an adhesive free absorption region according to still another embodiment of the present invention.
Figure 10B:
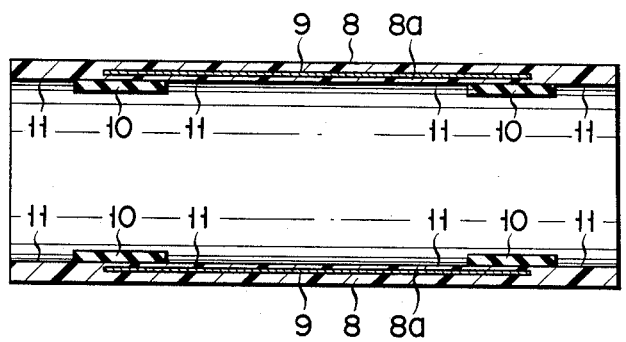
FIG. 10B is a sectional view of the tube shown in FIG. 10A.
Figure 11:
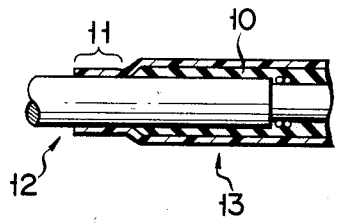
FIG. 11 is a representation for explaining the effect of the adhesive free absorption region when the tube is shrunk in a water impervious heat shrinkable tube with an adhesive free absorption region.

In a water impervious heat shrinkable tube with adhesive free absorption regions 11 as shown in FIGS. 9B and 10B, after coating a joint 13 of cables 12, the adhesive free absorption regions 11 are formed to prevent flow of an adhesive or compound outside the joint 13, as shown in FIG. 11.

For this reason, the water impermeability of the water impervious heat shrinkable tube along the longitudinal direction thereof is further improved. Furthermore, when the tube is shrunk upon application of heat or is in use, the adhesive may not flow outside the joint to adhere to other objects, thereby preventing impairment of the outer appearance.

The adhesive free absorption regions 11 may be formed inside the adhesive layer 10 along the longitudinal direction of the tube as shown in FIG. 10B. In this case, the adhesive compound may not flow inward along the longitudinal direction thereof to improve water-tightness of the tube portion having the adhesive layer 10.

As for the position of the adhesive layer 10 in the heat shrinkable tube along the longitudinal direction thereof, it is so formed that at least part of the adhesive layer 10 overlaps the position of the laminated metal foil layer 9 so that gaps formed by wrinkles upon shrinkage of the metal foil layer are filled by the adhesive layer 10 to maintain excellent water impermeability.

The metal foil film to be used in a water impervious heat shrinkable tube of the present invention may be a metal foil film of copper, aluminum or lead. In particular, lead is most preferable since it has excellent resistance to mechanical fatigue against mechanical strain, excellent corrosion resistance, and excellent chemical resistance.

A plastic material to be laminated on both surfaces of a selected metal foil film may be selected from high-, medium- or low-density polyethylene, polypropylene, polybutene-1, polymethylpentene, an ethylene-ethylacrylate copolymer, an ethylene-vinyl acetate-vinyl chloride graft copolymer, chlorinated polyethylene and the like. Meanwhile, if a rubber material is used to be laminated on both surfaces of a selected metal foil film, such a rubber material may be selected from isoprene rubber, a chloroprene rubber, a styrene-butadiene rubber, and the like. Such a plastic or rubber material may be an electrically insulating material or a semiconducting material which is rendered semiconducting by the addition of a conductive material such as carbon black to such an electrically insulating material in a suitable amount.

The material of a heat shrinkable tube of the present invention is preferably polyethylene, polyvinyl chloride, saturated polyester, crosslinked polyethylene, ethylene-propylene rubber, silicone rubber, chloroprene rubber, fluoroplastic, or the like. Such a material must have a shrinking rate of at least 20% with respect to its original size upon being formed into a tube.

In order to integrally form the laminated metal foil layer and the heat shrinkable tube, they must be heat sealed. It is preferable that the rubber or plastic laminated on the metal foil film is the same or of a similar type as the material used for the tube. For example, if polyethylene is used as the material of the tube, polyethylene is preferably laminated on the two surfaces of the metal foil film.

The material of the heat shrinkable tube may be electrically insulating or semiconducting. If the heat shrinkable tube is semiconducting, the plastic or rubber material to be laminated on the metal foil film may also be semiconducting. In this case, a heat shrinkable tube including a metal foil film may be handled as a conductive tube.

Furthermore, the inner layer of the tube inside the laminated metal foil layer may be semiconducting, while the outer layer of the tube outside the laminated metal foil layer may be electrically insulating. A water impervious heat shrinkable tube using such a semiconducting material may be fitted directly on a shield of an insulating reinforcing element such as a joint of a high-voltage cable or on a shield of a cable, without use of an intermediate adhesive layer. In this case, the metal foil layer in the tube is electrically connected to such a shield. Therefore, the metal foil layer does not electrically float and cause partial discharge. The cable joint or the like is not therefore damaged due to discharge. Moreover, workers such as cable joint splicers who may directly touch a water impervious heat shrinkable tube are not exposed to the danger of electric shock or the like.

Figure 12:
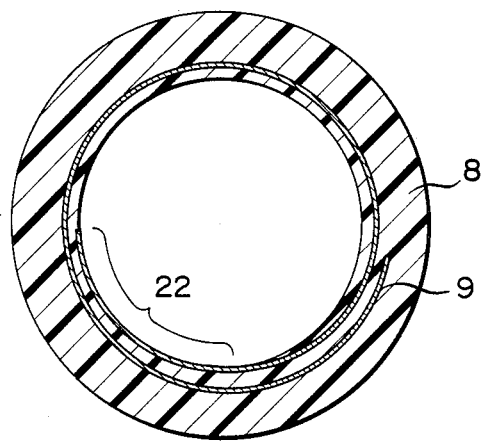
FIG. 12 is a sectional view of a water impervious heat shrinkable tube of the present invention in which an end of a semiconducting plastic laminated metal foil layer is exposed to the innermost surface of the tube.
Figure 13:
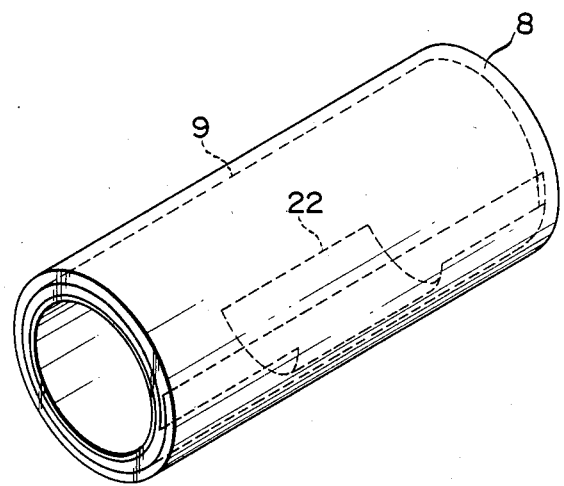
FIG. 13 is a perspective view of the tube shown in FIG. 12.

Similar effects can also be obtained if a heat shrinkable tube material is electrically insulating and if the following measures are taken. A semiconducting material is selected as the laminating material on the metal foil film. Furthermore, as shown in FIGS. 12 and 13, one side edge 22 of a laminated metal foil layer 9 along the peripheral direction thereof is exposed to the inner surface of the tube, and such an exposed portion of the metal foil layer 9 is brought into direct contact with a shield of a cable joint or the like without the use of an intermediate adhesive layer. If an adhesive layer is semiconducting, it may be interposed between the exposed portion of the metal foil layer and the shield of a cable or a cable joint.

As may be apparent from the above description and the following description of Examples, a water impervious heat shrinkable tube of the present invention allows complete prevention of water permeation in the radial direction or from an end of the tube, allows also slight permeation of water therethrough, and has a smooth surface.

The present invention will now be described by way of Examples.

EXAMPLES 1 to 4 and COMPARATIVE
EXAMPLES 1 and 2

Figure 14:
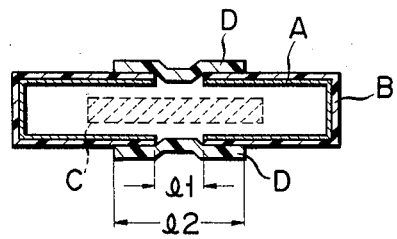
FIG. 14 is a representation for explaining measurements of water permeability of a water impervious heat shrinkable tube of the present invention.

Water impervious heat shrinkable tubes of the configurations given in Table 1 below were prepared. Samples as shown in FIG. 14 were prepared from these tubes. The samples were immersed in warm water at 60° C. and were left submerged in water for 30 days. The samples were later taken out of the water, and the respective amounts of permeated water were measured. The obtained results and results of visual observation of the outer appearance of the tubes after shrinkage are shown in Table 1.

Referring to FIG. 14, reference symbol A denotes a copper pipe of 35 mm outer diameter with one end sealed, on which polyethylene B is coated. Two such copper pipes were aligned with their open ends facing each other. After placing a desiccant (silica gel) C inside the pipes, the open ends were inserted inside a water impervious heat shrinkable tube D. This model sample was heated to be tested.

The shrunk portion of the heat shrinkable tube D had dimensions of $l_1 = 50$ mm and $l_2 = 150$ mm. The amount of water which had permeated the tube was measured in the following manner. After the sample had been immersed in water for 30 days, the weight of the desiccant measured before immersion in water was subtracted from that of the desiccant measured after immersion. The values shown are respectively mean values for three samples.

A comparison of Examples and Comparative Examples in Table 1 reveals that the amount of water which had permeated into a water impervious heat shrinkable tube of the present invention was about 1/300 to 1/750 of that of a heat shrinkable tube consisting of the same heat shrinkable material alone and excluding a water impervious metal foil layer (Comparative Example 1).

These results indicate that the tube of the present invention has excellent water impermeability both in the direction of thickness of the tube and in the longitudinal direction of the tube.

Figure 1:
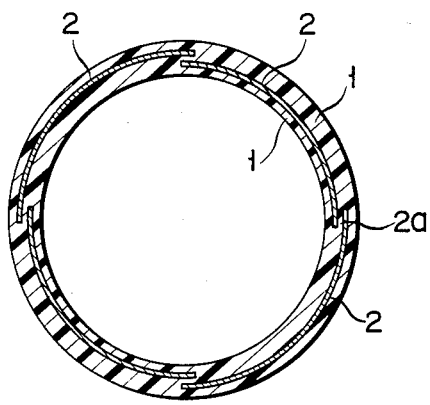
FIG. 1 is a sectional view of a conventional water impervious heat shrinkable tube previously proposed by the present inventors.
Figure 2:
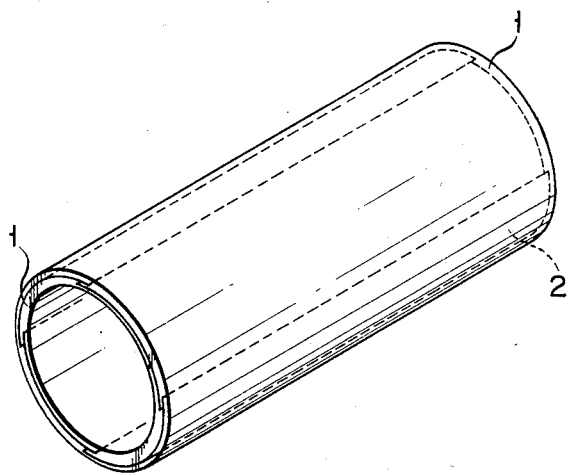
FIG. 2 is a perspective view of the tube shown in FIG. 1.
Figure 3:
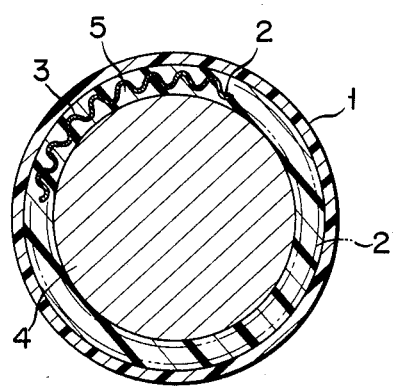
FIG. 3 is a sectional view showing rough wrinkles formed in the tube shown in FIG. 1 upon heating.

In a heat shrinkable tube wherein a water impervious metal layer is so formed that the thickness of the portion outside the heat shrinkable layer is smaller than that of the portion inside the heat shrinkable layer, as in Comparative Example 2, four laminated metal foil layers were arranged so that their longitudinal edges overlapped each other by 10 mm, respectively. In this tube, as illustrated in FIG. 3, the wrinkles of the metal foil layer became too large locally; the outer surface was rough, and the amount of water permeation was only slightly lower than in Comparative Example 1. Thus, no effect of the laminated metal foil layer was exhibited. In this case, the water permeation is considered attributable mainly to water which permeates into the tube along the longitudinal direction thereof.

EXAMPLES 4 and 5

Figure 15A:
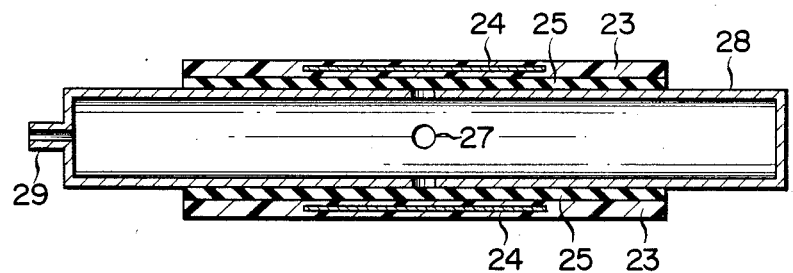
FIGS. 15A and 15B are representations showing the configuration of samples for explaining an experiment for measuring gas leakage characteristics of a water impervious heat shrinkable tube of the present invention.
Figure 15B:
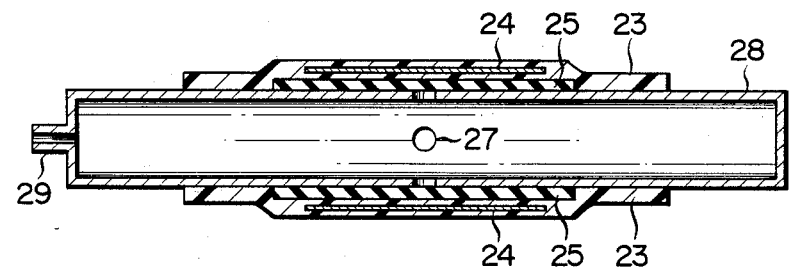

In order to examine the effect of a water impervious heat shrinkable tube having an adhesive flow absorption region for an adhesive layer, water impervious heat shrinkable tubes having configurations as indicated in Table 2 below were prepared to provide samples as shown in FIGS. 15A and 15B. After being immersed in warm water at 60° C., the samples were subjected to a gas leakage test of 30 days (720 hrs), two each at an internal pressure of 0.5 kg/cm$^2$ (G) and at an external pressure of 1.0 kg/cm$^2$ (G). Referring to FIGS. 15A and 15B, reference numeral 28 denotes a copper pipe having gas leakage holes 27, one sealed end and one open end 29. FIG. 15A shows a water impervious heat shrinkable tube 23, having an adhesive layer 25 along the entire inner surface thereof and a laminated metal foil layer 24 at its center, coated on a copper pipe 28 having gas leakage holes 27. FIG. 15B shows a water impervious heat shrinkable tube 23 having adhesive flow absorption regions inside at ends thereof. With a tube of Example 5 wherein the adhesive layer is formed along the entire length of the tube, gas leakage occurred at a pressure of 1.0 kg/cm$^2$ (G). However, in a tube of Example 6 including the adhesive flow absorption regions at the two ends thereof, gas leakage did not occur.

In practice, the pressure which may be established inside the tube by a load fluctuation in a general cable joint or the like is about 0.2 kg/cm$^2$ (G). When the water impervious heat shrinkable tube of Example 5 is used for a power cable joint or the like, it provides an excellent watertightness. However, the water impervious heat shrinkable tube of Example 6 having adhesive flow absorpotion regions provides an even better watertightness.

As may be seen from the Examples and Comparative Examples, a water impervious heat shrinkable tube of the present invention provides excellent water impermeability not only in the direction of thickness thereof but also in the longitudinal direction thereof and thus allows formation of a covering with a smooth surface and of high product quality.

As was demonstrated in the Examples and Comparative Examples, the water impermeability of a tube of the present invention is several hundred times greater than that of a conventional tube without a water impervious metal foil layer. A high-voltage crosslinked polyethylene insulating power cable, for example, is known to be significantly degraded in electrical resistivity due to water immersion after use for a long period of time. However, if a water impervious heat shrinkable tube of the present invention is used to protect a joint or the like of such cables, the electrical resistivity of the cables is significantly improved. Thus, the water impervious heat shrinkable tube of the present invention provides a variety of practical applications.

TABLE 1

|  | Example 1 | Example 2 | Example 3 |
| --- | --- | --- | --- |
| Configuration of laminated metal foil layer | PE(50μ)/Pb(50μ)/-PE(50μ) (overall thickness: 0.15 mm) | PE(100μ)/Al(30μ)/-PE(100μ) (overall thickness: 0.23 mm) | PET(50μ)/Cu(10μ)/-PET(50μ) (overall thickness: 0.15 mm) |
| Material of heat shrinkable layer | Polyethylene | Polyethylene | Saturated polyester |
| Inner diameter of heat shrinkable tube | 80 mm | 80 mm | 50 mm |
| Thickness of heat shrinkable tube (including metal foil layer) | 1.0 mm | 1.0 mm | 1.0 mm |
| Positions of heat shrinkable material layer and metal foil layer | Outer layer of heat shrinkable material layer: 0.70 mm; metal foil layer: 0.15 mm; inner layer of heat shrinkable material layer: 0.15 mm | Outer layer of heat shrinkable material layer: 0.52 mm; metal foil layer: 0.23 mm; inner layer of heat shrinkable material layer: 0.25 mm | Outer layer of heat shrinkable material layer: 0.65 mm; metal foil layer: 0.15 mm; inner layer of heat shrinkable material layer: 0.20 mm |
| Length of overlap portion of metal foil layer | 10 mm (overlap portion is heat sealed) | 10 mm (overlap portion is heat sealed) | 10 mm (overlap portion is heat sealed) |
| Length of heat shrinkable tube | 150 mm (no metal foil layer at portions 20 mm from both ends of tube) | 150 mm (no metal foil layer at portions 20 mm from both ends of tube) | 150 mm (no metal foil layer at portions 20 mm from both ends of tube) |
| Material of adhesive layer | Natural rubber-type | Butyl rubber-type | Butyl rubber-type |
| Thickness of adhesive layer | 0.6 mm | 0.8 mm | 0.6 mm |
| Maximum shrinkage of heat shrinkable | 75% | 75% | 50% |

TABLE 1-continued

| | | | |
|---|---|---|---|
| tube | | | |
| Outer appearance after shrinkage | Smooth outer surface; only slight roughness | Smooth outer surface; only slight roughness | Smooth outer surface; only slight roughness |
| Shrinkage of sample | 56% | 56% | 30% |
| Amount of permeated water | 1.8 mg | 2.3 mg | 3.5 mg |

| | Example 4 | Comparative Example 1 | Comparative Example 2 |
|---|---|---|---|
| Configuration of laminated metal foil layer | Conductive chloroprene rubber (100μ)/Al(30μ)/conductive chloroprene rubber (100μ) (overall thickness: 0.23 mm) | No metal foil layer | PE(100μ)/Al(100μ)/PE(100μ) (overall thickness: 0.30 mm) |
| Material of heat shrinkable layer | Conductive chloroprene rubber | Polyethylene | Polyethylene |
| Inner diameter of heat shrinkable tube | 50 mm | 80 mm | 80 mm |
| Thickness of heat shrinkable tube (including metal foil layer) | 1.0 mm | 1.0 mm | 1.0 mm |
| Positions of heat shrinkable material layer and metal foil layer | Outer layer of heat shrinkable material layer: 0.52 mm; metal foil layer: 0.23 mm; inner layer of heat shrinkable material layer: 0.25 mm | Single, heat shrinkable material layer: 1.0 mm | Outer layer of heat shrinkable material layer: 0.20 mm; metal foil layer: 0.30 mm (4 metal foil films used); inner layer of heat shrinkable material layer: 0.50 mm |
| Length of overlap portion of metal foil layer | 10 mm (overlap portion is heat sealed) | — | 10 mm (overlap portion is heat sealed) |
| Length of heat shrinkable tube | 150 mm (no metal foil layer at portions 20 mm from both ends of tube) | 150 mm | 150 mm (no metal foil layer at portions 20 mm from both ends of tube) |
| Material of adhesive layer | Natural rubber-type | Natural rubber-type | Natural rubber-type |
| Thickness of adhesive layer | 0.8 mm | 0.6 mm | 0.8 mm |
| Maximum shrinkage of heat shrinkable tube | 50% | 75% | 75% |
| Outer appearance after shrinkage | Smooth outer surface; only slight roughness | Smooth outer surface after shrinkage | Significant roughness on outer surface; rough wrinkles in metal foil layer |
| Shrinkage of sample | 29% | 56% | 56% |
| Amount of permeated water | 4.2 mg | 1440 mg | 1200 mg |

TABLE 2

| | Example 5 | Example 6 |
|---|---|---|
| Configuration of laminated metal foil layer | PE(50μ)/Pb(50μ)/PE(50μ) (overall thickness: 0.15 mm) | PE(50μ)/Pb(50μ)/PE(50μ) (overall thickness: 0.15 mm) |
| Material of heat shrinkable layer | Polyethylene | Polyethylene |
| Inner diameter of heat shrinkable tube | 70 mm | 70 mm |
| Thickness of heat shrinkable tube (including metal foil layer) | 1.0 mm | 1.0 mm |
| Positions of heat shrinkable material layer and metal foil layer | Outer layer of heat shrinkable material layer: 0.70 mm; metal foil layer: 0.15 mm; inner layer of heat shrinkable material layer: 0.15 mm | Outer layer of heat shrinkable material layer: 0.70 mm; metal foil layer: 0.15 mm; inner layer of heat shrinkable material layer: 0.15 mm |
| Length of overlap portion of metal foil layer | 10 mm | 10 mm |
| Length of heat shrinkable tube | 170 mm (no metal foil layer at portions 20 mm from both ends of tube) | 170 mm (no metal foil layer at portions 20 mm from both ends of tube) |
| Material of adhesive layer | Butyl rubber-type | Butyl rubber-type |
| Thickness of adhesive layer | 0.8 mm | 0.8 mm |
| Position of adhesive layer | Along entire length of heat shrinkable tube | No adhesive mass layer at portions 20 mm from both ends of tube (flow absorption regions) |
| Air-tightness (in 60° C. warm water) Test pressure: 0.5 kg/cm² (G) | Neither of 2 samples caused gas leakage | Neither of 2 samples caused gas leakage |
| Test pressure: 1.0 | Sample 1: gas leaked after 420 hrs; Sample 2: gas leaked | Neither of 2 samples caused gas leakage |

TABLE 2-continued

| | Example 5 | Example 6 |
|---|---|---|
| kg/cm² (G) | after 456 hrs | |

What we claim is:

1. A water impervious heat recoverable rubber or plastic tube comprising:

an inner and outer layer forming a tube, each layer having a thickness in the radial direction of the tube and each layer comprising a heat shrinkable plastic or rubber;

a laminated metal foil layer interposed between said inner and outer layers, the thickness of said inner layer being less than the thickness of the outer layer over the complete extent of the portion of the tube containing said laminated foil layer, said laminated metal foil layer having two longitudinal edges and comprising a metal foil film having a thickness of 0.01 mm to 0.1 mm and, an electrically insulating or semiconducting rubber or plastic sheet laminated on each surface of said metal foil film, said laminated metal foil layer extending up to the entire length of said tube and extending within said tube over more than 360° in the circumferential direction of said tube, the complete longitudinal extent of the two longitudinal edges of said laminated metal foil layer overlapping each other in said circumferential direction over a predetermined distance in said circumferential direction.

2. The tube according to claim 1, further comprising an insulating or semiconducting adhesive layer on up to the entire surface of said inner layer.

3. The tube according to claim 2, wherein said tube comprises opposed end regions, said adhesive layer being on the inner surface of said inner layer except at said opposed end regions of said tube.

4. The tube according to claim 2, wherein said tube comprises a central region and opposed end regions each having a predetermined length, said adhesive layer being on the inner surface of said inner layer except at said opposed end regions and said central region of said tube.

5. The tube according to claim 1, wherein said heat shrinkable rubber or plastic is selected from the group consisting of polyethylene, polyvinyl chloride, saturated polyester, cross-linked polyethylene, ethylene-propylene rubber, silicone rubber, chloroprene rubber, and fluoroplastic.

6. The tube according to claim 1, wherein said inner and outer layer comprises a semiconducting rubber or plastic.

7. The tube according to claim 1, wherein said tube has a shrinking rate of at least 20% along the peripheral direction thereof with respect to the original dimensions thereof.

8. The tube according to claim 1, wherein said inner layer comprises a semiconducting rubber or plastic and said outer layer comprises an electrically insulating rubber or plastic.

9. The tube according to claim 8, wherein the rubber or plastic of said electrically insulating or semiconducting rubber or plastic sheet is selected from the group consisting of high density polyethylene, medium density polyethylene, low density polyethylene, polypropylene, polybutene-1, polymethylpentene, an ethylene-ethylacrylate copolymer, an ethylene-vinylacetate-vinyl chloride graft copolymer, chlorinated polyethylene isoprene rubber, chloroprene rubber and styrene-butadiene rubber.

10. The tube according to claim 1, wherein said metal foil film in said tube comprises a member selected from the group consisting of a copper foil film, an aluminum foil film, and a lead foil film.

11. The tube according to claim 10, wherein said metal foil film is a lead foil film.

12. The tube according to claim 1, wherein a predetermined length of one of said two longitudinal edges of said metal foil layer is exposed on the inner surface of said tube.

13. The tube according to claim 1, wherein the rubber or plastic of said electrically insulating or semiconducting rubber or plastic sheet is selected from the group consisting of high density polyethylene, medium density polyethylene, low density polyethylene, polypropylene, polybutene-1, polymethylpentene, an ethylene-ethylacrylate copolymer, an ethylene-vinylacetate-vinyl chloride graft copolymer, chlorinated polyethylene isoprene rubber, chloroprene rubber and styrene-butadiene rubber.

14. The tube according to claim 1 wherein said sheet contains carbon black.

15. The tube of claim 1, wherein overlapping longitudinal edge portions of said metal foil layer are spaced from each other in the radial direction of said tube.

16. The tube of claim 1 wherein said laminated metal foil layer extends over the entire length of said tube.

17. A water impervious heat recoverable rubber or plastic comprising:

an inner and outer layer forming a tube, each layer having a thickness in the radial direction of the tube and each layer comprising a heat shrinkable plastic or rubber selected from the group consisting of polyethylene, polyvinyl chloride, saturated polyester, cross-linked polyethylene, ethylene-propylene rubber, silicone rubber, chloroprene rubber, and fluoroplastic;

a laminated foil layer interposed between said inner and outer layers, the thickness of the inner layer being less than the thickness of the outer layer over the complete extent of the portion of the tube containing said laminated foil layer, said laminated foil layer having two longitudinal edges and comprising a metal foil film having a thickness of 0.01 mm to 0.1 mm and being selected from the group consisting of a copper foil film, an aluminum foil film and a lead foil film, and an electrically insulating or semiconducting rubber or plastic sheet laminated on each surface of said metal foil film, wherein the rubber or plastic is selected from the group consisting of high density polyethylene, medium density polyethylene, low density polyethylene, polypropylene polybutene-1, polymethylpentene, an ethylene-ethylacrylate copolymer, an ethylenevinylacetate-vinyl chloride graft copolymer, chlorinated polyethylene, isoprene rubber, chloroprene rubber and styrene-butadiene rubber, said laminated metal foil layer extending up to the entire length of said tube and extending within said tube over more than 360° in the circumferential direction, the complete longitudinal extent of the two longitudinal edges of said laminated metal foil layer overlapping each other in said circumferential direction over a predetermined distance in said circumferential direction.

18. The tube according to claim 17, further comprising an insulating or semiconducting adhesive layer is formed on up to the entire inner surface of said inner layer.

19. The tube according to claim 18, wherein said tube comprises opposed end regions, said adhesive layer being on the inner surface of said inner layer except at said opposed end regions of said tube.

20. The tube according to claim 18, wherein said tube comprises a central region and opposed end regions each having a predetermined length, said adhesive layer being on the inner surface of said inner layer except at said opposed end regions and said central region of said tube.

21. The tube according to claim 17, wherein said tube has a shrinking rate of at least 20% along the peripheral direction thereof with respect to the original dimensions thereof.

22. The tube according to claim 17, wherein said inner layer comprises a semiconducting rubber or plastic and said outer layer comprises an electrically insulating rubber or plastic.

23. The tube according to claim 17, wherein said metal foil film is a lead foil film.

24. The tube of claim 17, wherein overlapping longitudinal edge portions of said metal foil layer are spaced from each other in the radial direction of said tube.

25. The tube of claim 17 wherein said laminated metal foil layer extends over the entire length of said tube.

* * * * *